May 8, 1951 C. J. PROBECK 2,552,456

HIGH-FREQUENCY TUBE SOCKET

Filed May 18, 1949

CHARLES J. PROBECK
*INVENTOR.*

BY Francis W. Crotty
HIS ATTORNEY

Patented May 8, 1951

2,552,456

UNITED STATES PATENT OFFICE 2,552,456

HIGH-FREQUENCY TUBE SOCKET

Charles John Probeck, Chicago, Ill., assignor to The Rauland Corporation, a corporation of Illinois Application May 18, 1949, Serial No. 93,906

6 Claims. (Cl. 173—328)

This invention relates to an improved support for an electron-discharge device and, more particularly, to a support adapted to be employed in an electrical circuit in which a plurality of the contact pins of the device are maintained at essentially the same reference potential. The support may be used to advantage in connection with a vacuum tube and associated circuit designed for operation at high radio frequencies. However, utilization of the invention is not limited to this specific application.

One type of tube support which has previously been employed utilizes a plurality of conductive pin-engaging members affixed to an insulating support which, in turn, is secured to a chassis or base plate. Individual pin-engaging members engage respective contact pins of the vacuum tube and connectors extending from the pin-engaging members serve to incorporate the tube into a desired circuit arrangement. If that arrangement requires that one or more of the contact pins of the tube be maintained at ground potential, it is conventional to use the base plate as a ground plane and to provide one or more conductors for connecting the necessary pin-engaging members to the base plate. In a circuit designed for operation at relatively high radio frequencies, 100 megacycles for example, each such conductor because of its physical length forms a predominantly inductive impedance of appreciable value. Further, if this impedance is in the cathode circuit of a conventional radio-frequency amplifier, it is common to both the input and output circuits and introduces a strong tendency toward oscillation. For a great many installations any tendency to oscillation is highly undesirable so the described prior structures are of limited application.

Tube supports of the prior art may further be objectionable because of the inadequate cooling they afford the contact pins. As previously described, these arrangements feature pin sockets imbedded within an insulating member but, since insulating material usually has poor heat conducting qualities, cooling of the contact pins is quite limited.

It is an object of this invention, therefore, to provide an improved support for an electron-discharge device including a cluster of contact pins, a plurality of which are to be maintained at essentially the same reference potential.

It is a further object of this invention to provide a support for an electron-discharge device including a cluster of contact pins in which cooling of such pins is readily achieved.

In accordance with the invention, a support for an electron-discharge device including a cluster of contact pins, a plurality of which are to be maintained at essentially the same reference potential, comprises an electrically conductive base plate having a cutaway portion which defines a group of lug members collectively having a plurality of apertures arranged in a pattern corresponding to the distribution of the plurality of pins in the pin cluster. A plurality of resilient, electrically conductive pin-engaging members are conductively supported by the lug members in alignment with individual ones of the apertures for releasably engaging the plurality of pins.

The features of the present invention which are believed to be novel are set forth with particularity in the appended claims. The present invention itself, both as to its organization and manner of operation, together with further objects and advantages thereof may best be understood by reference to the following description taken in connection with the accompanying drawing in which:

Figure 1:
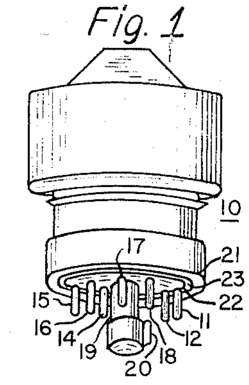
Fig. 1 is an isometric view of an electron tube particularly suitable for utilization with the invention.

In Fig. 1, the electron tube 10 there represented is of the type identified by the designation 4X150A. Type 4X150A is a power tetrode, designed specifically for operation at high radio frequencies in the neighborhood of 500 megacycles. Although a particular type of electron tube is illustrated, it is to be understood that the tube itself forms no part of this invention and is referred to herein purely by way of exemplifying the structure and utilization of the support embodying the present invention.

Electron tube 10 has the usual cluster of contact pins 11 through 18, arranged in a circular pattern disposed about a central conductive locating pin 19. Contact pin 13 is hidden behind locating pin 19 but may be seen in Fig. 3. Locating pin 19 includes a key 20 to orient the tube when placed on a support with the plurality of pins of the cluster aligned for engagement with a plurality of pin-engaging members. A conductive flange 21 extends from a casing 22 of tube 10 to define a channel way 23. This is more clearly illustrated in Fig. 3, wherein there also is shown an electrode supporting structure 24 which is physically and electrically connected with channel way 23 through case portion 22.

The electrical connections extending from the several pins to the various electrodes of tube 10 are not illustrated in the drawing. However, the device illustrated in Fig. 1 includes electrical connections as follows: contact pins 11 and 15 are connected with electrode support 24 in turn connected with a screen grid, locating pin 19 is connected with a control grid, contact pins, 12, 14, 16 and 18 are connected with a cathode, and contact pins 13 and 17 are connected with respective ends of a filament.

Figure 2:
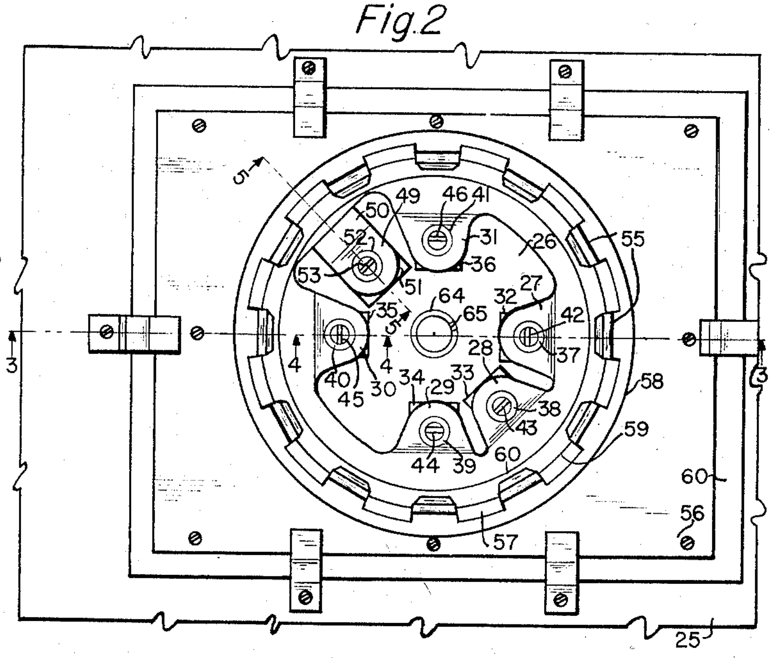
Fig. 2 is a plan view of a portion of a base plate or chassis including a support for an electron tube embodying the present invention.

Referring now more particularly to Fig. 2, the support there represented accommodates the discharge device illustrated in Fig. 1. Moreover, it will be assumed that five of the cluster of contact pins (12, 14, 16, 17 and 18) of tube 10 are to be maintained at essentially the same reference potential, such as ground potential, during the operation of the tube in a particular circuit. The support comprises a base plate 25 which is formed of a highly conductive material such as silver-plated brass. While the support may be constructed as a separate element distinct from a chassis on which it may be mounted, it is convenient for many installations to utilize the chassis of the apparatus itself as the conductive base plate which then affords a convenient ground plane for the equipment. The base plate 25 is provided with a stamped-out or cut-away portion 26 of such configuration as to define a group of lug members or fingers 27 through 31 extending from the base plate and converging toward the center of the cut-out portion.

Figure 3:
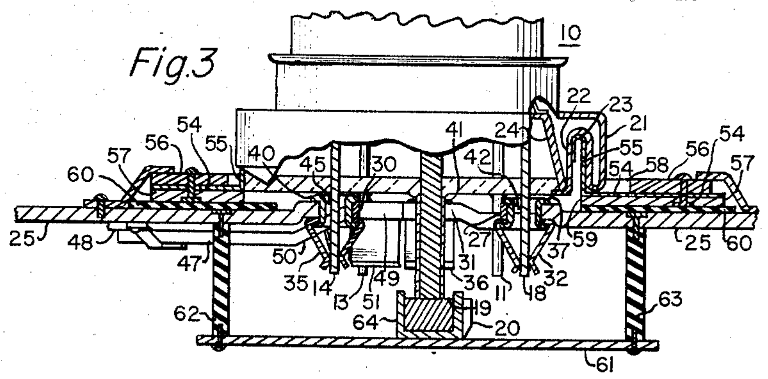
Fig. 3 is a sectional view taken along the line 3—3 of Fig. 2 and shows a portion of the electron tube represented in Fig. 1 positioned in the support, portions of the tube being shown in section.

Referring now to Fig. 3, it will be seen that the fingers or lug members are deflected in a plane parallel to that of the base plate 25 but slightly above, although, if desired, these fingers may extend wholly within the plane of the base plate. Each of the lug members 27 through 31 supports respective ones of several pin-engaging or clip members 32 through 36. The pin-engaging members are formed of a conductive resilient material such as silver plated Phosphor-bronze and depend from the plane of the lug members.

Figure 4:
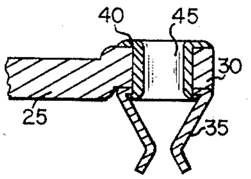
Fig. 4 is an enlarged sectional view taken along line 4—4 of Fig. 2.

Each of the pin-engaging members is secured to its respective lug member by means of one of a plurality of conductive eyelets or hollow fastening members 37 through 41. Thus, an opening or aperture is provided in each of the lug members and apertures 42 through 46 are arranged in an aperture pattern corresponding to the distribution of the cluster of pins of electron tube 10 which are to be maintained at the same reference potential. Since the pin-engaging members are secured to the lug members by the hollow fastening members, it is apparent that the pin-engaging members are arranged in the aperture pattern in a manner corresponding to the distribution of the pins in the afore-mentioned pin cluster of electron tube 10. Fig. 4 shows more clearly the manner in which a pin-engaging member is secured to a lug member by a hollow fastening member.

In Fig. 3, a conductive plate 47 is shown as being supported below base plate 25, but insulated therefrom by means of a sheet of insulating material 48. This is more clearly illustrated in Fig. 5. Sheet 48 is preferably of silvered mica which is utilized, as opposed to non-coated mica, in order that a high capacitance may be obtained between plate 47 and base plate 25. A lug member 49 is supported in cut-away portion 26 by plate 47 on an S-shaped adjoining portion 50 as shown in Fig. 2. A pin-engaging member 51 is secured to lug member 49 by means of a hollow fastening member 52 and an opening 53 is disposed within the aperture pattern, including apertures 42 through 46.

Figure 5:
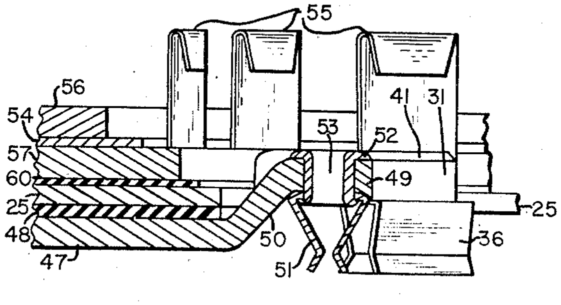
Fig. 5 is an enlarged sectional view taken along line 5—5 of Fig. 2.

Referring again to Fig. 3, a contact member 54 having a plurality of resilient, upstanding, U-shaped portions 55 is supported on base plate 25 and intermediate mounting plates 56 and 57. The U-shaped portions are circularly arranged about cut-away portion 26 and the aperture pattern for reception by channel way 23 when tube 10 is positioned in the supporting arrangement. Mounting plate 56 has a circular opening 58 such that U-shaped portions 55 are surrounded by the opening and project upwardly and above the surface of plate 25. Mounting plate 57 has a circular opening 59 somewhat smaller than opening 58 but large enough to clear the lug members. Mounting plate 57 is insulated from base plate 25 by means of an electrical insulating sheet 60 similar to the material used for sheet 48. Thus, contact member 54 is insulated from base plate 25 but is capacitively connected thereto. Fig. 5 more clearly shows the manner in which contact member 54 is positioned on base plate 25.

Referring once again to Fig. 3, there appears a conductive sub-base 61 supported below base plate 25 by insulators 62 and 63. A socket member 64, formed of a resilient electrically conductive material, is supported on sub-base 61 and includes a key-way 65. Socket member 64 and its key-way 65 are arranged to receive locating pin 19 to orient tube 10 on the support with the plurality of pins in the cluster aligned for engagement with the plurality of pin-engaging members.

In inserting electron-discharge device or vacuum tube 10 in the support embodying this invention, locating pin 19 is placed in contact with socket member 64 and tube 10 is rotated until key 20 engages key-way 65. The tube is thereupon pushed downwardly with key 20 riding in key slot 65. The pins in the cluster of pins pass through individual apertures in the aperture pattern and individual clip members engage and make electrical contact with respective ones of the pins. Also, the plurality of U-shaped portions 55 of contact member 54 are simultaneously received by channel way 23 of tube 10 making an electrical contact with case portion 22.

With the tube 10 thus positioned, contact pins 12, 14, 16, 17 and 18 are electrically connected with base plate 25 through respective pin-engaging members and lug members; electrode support 24 is connected to plate 56 through case portion 22, U-shaped portions 55 and contact member 54; and pin 13 is connected to plate 47 through pin-engaging member 51, lug member 49 and S-shaped portion 50. In addition, pins 11 and 15 are free of connections since pin 11 is disposed between lug members 27 and 31 and pin 15 is disposed between lug members 29 and 30. As pointed out hereinbefore, a connection to the screen-grid of tube 10 is completed through case portion 22, and thus, none is needed for these pins. Finally, sub-base 61 is connected to locating pin 19 through socket member 64.

It should be noted that the end of the filament of tube 10 which is connected to contact pin 13 and the screen grid which is conductively attached to electrode support 24, individually are capacitively coupled to base plate 25. Each of the condensers constructed in the manner aforedescribed have an area and a spacing such that the capacitive reactance of each is low at the operating frequency for tube 10 and constitutes a bypass condenser for alternating voltages at this frequency.

It is apparent that since pin-engaging members 32 through 36 are directly supported on base plate 25 by lug members 27 through 31 respectively, the electrical connections completed between base plate 25 and contact pins 12, 14, 16, 17 and 18 are extremely short and as a result only a small impedance at the operating radio frequencies is introduced by each. Since the electron tube 10 illustrated in Fig. 1 includes electrical conductors between the cathode and each of the contact pins 12, 14, 16, 17 and 18, the invention provides four connections between the cathode and base plate 25. These connections are in parallel and, therefore, introduce a negligible impedance into the cathode circuit. Thus, the support for tube 10 embodying the invention can be used in the circuit of a radio-frequency amplifier, operable at high radio frequencies, with no tendency toward self-sustaining oscillations which may arise as a result of the imposition of a high impedance in the cathode circuit.

It is also apparent that since the contact pins are connected directly with base plate 25 through respective lug members and clip members, heat is readily conducted from the pins into the base plate and cooling of the pins and of the associated electrodes is achieved with ease. In addition, since socket member 35 is not surrounded by a heat insulating material, air-blast cooling of device 23 proper and the numerous metal-to-glass seals contained therein may be readily accomplished.

Furthermore, since the invention incorporates no electrical insulating material as utilized in a conventional tube socket dielectric losses associated with such material are absent. Thus, the invention facilitates operation of circuits at high radio frequencies with increased efficiency.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A support for an electron-discharge device including a cluster of contact pins, a plurality of which are to be maintained at essentially the same reference potential, comprising: an electrically conductive base plate having a cut-away portion defining a group of lug members collectively having a plurality of apertures arranged in a pattern corresponding to the distribution of said plurality of pins in said pin cluster; and a plurality of resilient, electrically conductive pin engaging members conductively supported by said lug members in alignment with individual ones of said apertures for releasably engaging said plurality of pins.

2. A support for an electron-discharge device including a cluster of contact pins, a plurality of which are to be maintained at essentially the same reference potential, comprising: an electrically conductive base plate having a cut-away portion defining a plurality of lug members disposed in a plane parallel to but displaced from the plane of said base plate and collectively having a plurality of apertures arranged in a pattern corresponding to the distribution of said plurality of pins in said pin cluster; and a plurality of resilient, electrically conductive pin engaging members conductively supported by said lug members in alignment with individual ones of said apertures for releasably engaging said plurality of pins.

3. A support for an electron-discharge device including a cluster of contact pins, a plurality of which are to be maintained at essentially the same reference potential, comprising: an electrically conductive base plate having a plurality of apertures distributed in a manner corresponding to the distribution of said plurality of pins in said cluster; a plurality of resilient, electrically conductive pin engaging members; and a plurality of electrically conductive, hollow fastening members each disposed within one of said apertures in said base plate for securing said clip members to said base plate.

4. A support for an electron discharge device including a cluster of contact pins, a plurality of which are to be maintained at essentially the same reference potential, and further including a conductive flange extending from the casing of said device and defining therewith a channel way, said support comprising: an electrically conductive base plate having an aperture pattern for receiving said cluster of pins; a plurality of resilient, electrically conductive pin engaging members conductively supported directly on said base plate and arranged in said aperture pattern in a manner corresponding to the distribution of said plurality of pins in said pin cluster for individually, releasably engaging respective ones of said plurality of pins; and at least one contact member supported on said base plate in the vicinity of said aperture pattern and extending approximately normal to the plane of said base plate for reception by said channel-way when said device is positioned in said support.

5. A support for an electron discharge device including a cluster of contact pins, a plurality of which are to be maintained at essentially the same reference potential, and further including a conductive flange extending from the casing of said device and defining therewith a channel way, said supporting arrangement comprising: an electrically conductive base plate having an aperture pattern for receiving said cluster of pins; a plurality of resilient, electrically conductive pin engaging members conductively supported directly on said base plate and arranged in said aperture pattern in a manner corresponding to the distribution of said plurality of pins in said pin cluster for individually, releasably engaging respective ones of said plurality of pins; and at least one contact member having a resilient U-shaped portion supported on said base plate in the vicinity of said aperture pattern and extending approximately normal to the plane of said base plate for reception by said channel way when said device is positioned in said support.

6. A support for an electron discharge device including a cluster of contact pins, a plurality of which are to be maintained at essentially the same reference potential, including a conductive flange extending from the casing of said device to define therewith a channel way, and further including a conductive locating pin disposed within said cluster of pins and having a key positioned thereon, said support comprising: an electrically conductive base plate having an aperture pattern for receiving said cluster of pins; a plurality of resilient, electrically conductive pin engaging members conductively supported directly on said base plate and arranged in said aperture pattern in a manner corresponding to the distribution of said plurality of pins in said pin cluster for individually, releasably engaging respective ones of said plurality of pins; at least one contact member supported on said base plate in the vicinity of said aperture pattern and extending approximately normal to the plane of said base plate for reception by said channel way when said device is positioned in said support; and a socket member secured to said base plate in the vicinity of said aperture pattern having a key way for receiving said locating pin to orient said device on said support with said plurality of pins in said cluster aligned for engagement with said plurality of pin engaging members.

CHARLES JOHN PROBECK.

REFERENCES CITED

The following references are of record in the file of this patent:

UNITED STATES PATENTS

| Number | Name | Date |
| --- | --- | --- |
| 2,259,328 | Del Camp | Oct. 14, 1941 |